(12) United States Patent
Zhang

(10) Patent No.: US 12,104,031 B2
(45) Date of Patent: Oct. 1, 2024

(54) METHODS OF MODIFYING SURFACE OF FILM WITH INVERSE MINIEMULSION

(71) Applicant: CHANGZHOU UNIVERSITY, Jiangsu (CN)

(72) Inventor: Zhenqian Zhang, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/659,049

(22) Filed: May 9, 2024

(65) Prior Publication Data

US 2024/0287270 A1 Aug. 29, 2024

Related U.S. Application Data

(63) Continuation-in-part of application No. PCT/CN2022/128095, filed on Oct. 28, 2022.

(30) Foreign Application Priority Data

Nov. 9, 2021 (CN) .......................... 202111317511.2

(51) Int. Cl.
*C08J 7/02* (2006.01)
*B29C 71/02* (2006.01)
*C08J 5/18* (2006.01)

(52) U.S. Cl.
CPC . *C08J 7/02* (2013.01); *C08J 5/18* (2013.01); *C08J 7/08* (2013.01); *C08J 2327/16* (2013.01);
(Continued)

(58) Field of Classification Search
CPC ................... C08J 7/02; C08J 7/08; C08J 5/18
See application file for complete search history.

(56) References Cited

U.S. PATENT DOCUMENTS 8,092,595 B1 1/2012 Fan et al.
2006/0167147 A1 7/2006 Asgari

FOREIGN PATENT DOCUMENTS

BR 102019022410 * 5/2021
CA 2654668 * 1/2008
(Continued)

OTHER PUBLICATIONS

International Search Report in PCT/CN2022/128095 mailed on Jan. 18, 2023, 7 pages.
(Continued)

*Primary Examiner* — Edmund H Lee
(74) *Attorney, Agent, or Firm* — PORUS IP LLC

(57) ABSTRACT

Embodiments of the present disclosure provide a method of modifying a surface of a film with an inverse miniemulsion, the method comprising: preparing an inverse miniemulsion loaded with a precursor, and then configuring an alkaline miniemulsion, and finally preparing an oxide nanocrystal surface-modified film by a solvothermal process. Embodiments of the present disclosure drive an oxide nanocrystal precursor preloaded in the inverse miniemulsion to migrate to the surface of the film during a solvent thermal treatment by utilizing a pH-responsive polymer that changes the nature of the polymer in the presence of a change in pH, resulting in the formation of the oxide nanocrystal modification on the film surface. The functional film materials modified by the embodiments of the present disclosure have potential applications in the fields of semiconductor, photosensitivity and photoluminescence.

9 Claims, 1 Drawing Sheet

(52) U.S. Cl.
CPC ........ *C08J 2367/03* (2013.01); *C08J 2369/00* (2013.01)

(56) References Cited

FOREIGN PATENT DOCUMENTS

| | | |
|---|---|---|
| CN | 107117644 A | 9/2017 |
| CN | 108948246 A | 12/2018 |
| CN | 114015102 A | 2/2022 |
| JP | 20035055558 * | 2/2003 |
| WO | 2021121102 A1 | 6/2021 |
| WO | WO-2023083018 A1 * | 5/2023 |

OTHER PUBLICATIONS

Written Opinion in PCT/CN2022/128095 mailed on Jan. 18, 2023, 6 pages.
Decision to Grant a Patent in Chinese Application No. 202111317511.2 mailed on Nov. 2, 2022, 4 pages.
Zhang, Zhenqian et al., Preparation and photocatalytic performance of Cds@Bi2WO6 hybrid nanocrystals, Journal of Alloys and Compounds, 2021, 11 pages.

* cited by examiner

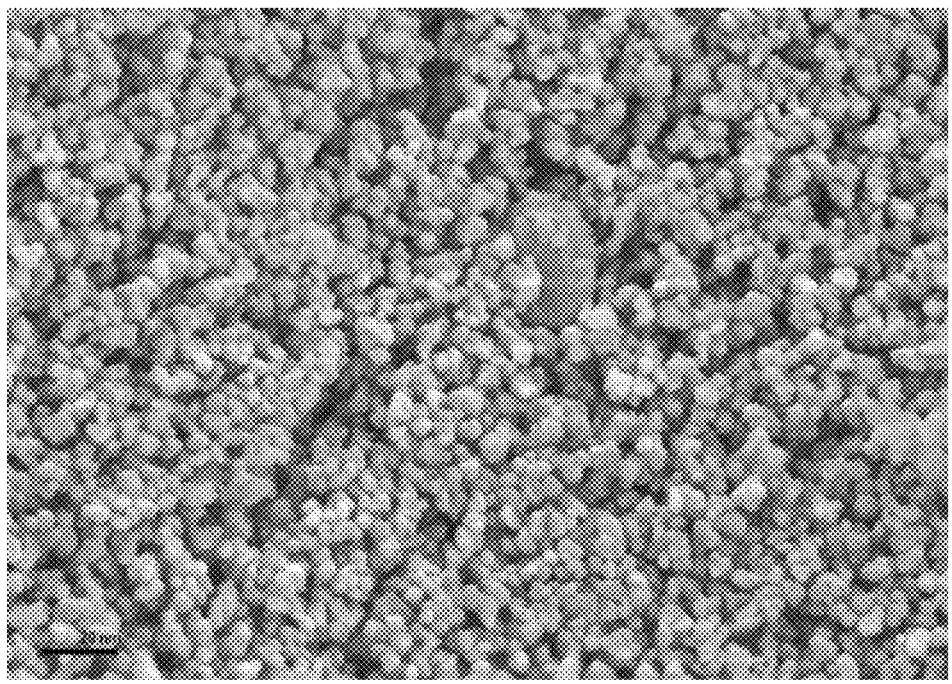

METHODS OF MODIFYING SURFACE OF FILM WITH INVERSE MINIEMULSION

CROSS-REFERENCE TO RELATED APPLICATIONS

This application is a continuation-in-part of International Application No. PCT/CN2022/128095 filed on Oct. 28, 2022, which claims priority to Chinese Patent Application No. 202111317511.2, filed on Nov. 9, 2021, the entire contents of each of which are herein by incorporated reference.

TECHNICAL FIELD

The present disclosure relates to the field of aqueous inverse colloids, solvent thermal treatment, and modification of functional materials, and in particular, relates to a method of modifying a surface of a film with an inverse miniemulsion.

BACKGROUND

The functional films are film materials that have the characteristics of electricity, magnetism, light, and heat or exhibit special functions under the action of electricity, magnetism, light, and heat. The functional films are commonly used in the manufacture of a variety of equipment with a unique function of the core components in automation, electronics, communications, energy, transportation, metallurgy, chemical industry, precision machinery, instrumentation, aerospace, defense, etc. The functional film has important uses in many fields.

The film surface modification is a processing treatment on the original base film to make the film have new physicochemical properties and desired functions. Surface modification of the film may be accomplished through chemical-physical surface modification, deposition technology, plasma technology, laser surface treatment, and other methods. However, these methods are complex, damage the material, and have poor surface modification uniformity.

Accordingly, embodiments of the present disclosure provide a method of modifying a surface of a film with an inverse miniemulsion. The method involves preloading the inverse miniemulsion with an oxide nanocrystal precursor and a pH-responsive polymer. The properties of the polymer change with pH variations. By modulating the conditions during solvent thermal treatment, the precursor migrates to the surface of the film for deposition and formation of the oxide nanocrystal, thus achieving the modification of the film surface.

SUMMARY

Embodiments of the present disclosure provide a method of modifying a surface of a film with an inverse miniemulsion. The method comprises:

(1) preparing an inverse miniemulsion loaded with a precursor:
obtaining an aqueous solution by dissolving a water-soluble metal salt that forms a precursor and a pH-responsive polymer in deionized water at room temperature and controlling pH to 7-8; and mixing the aqueous solution with a C4 solvent, and rapidly transferring the mixture into an ultrasonic biopulverizer at a pre-set temperature for pulverization to obtain the inverse miniemulsion loaded with the precursor;

(2) configuring an alkaline miniemulsion:
dissolving sorbitan monooleate in the C4 solvent at the room temperature and mixing it with an alkaline solution to form a mixture; and transferring the mixture into the ultrasonic biopulverizer at a pre-set temperature for pulverization to obtain the alkaline miniemulsion; and (3) preparing an oxide nanocrystal surface-modified film s by a solvothermal process:
after a film in a high-pressure reactor is stretched and fixed, adding the inverse miniemulsion loaded with the precursor prepared in step (1) and the alkaline miniemulsion prepared in step (2); placing the high-pressure reactor in an oven at a set temperature for thermal insulation, causing the precursor to migrate to the surface of the film for deposition and formation of an oxide nanocrystal by solvent thermal treatment, so as to obtain a modified film; and removing the modified film after the solvent thermal treatment is completed, repeatedly washing the modified film, and drying at the room temperature to obtain the oxide nanocrystal surface-modified film.

In some embodiments, the pH-responsive polymer of step (1) is at least one of poly(4-vinylpyridine), polydimethylaminoethyl methacrylate or poly(allylamine hydrochloride ester), and the pH-responsive polymer has a relative molecular mass of 1000-5000.

In some embodiments, the water-soluble metal salt of step (1) may be selected from at least one of sulfate, nitrate, and chloride having iron, copper, chromium, gold, or cadmium metals.

In some embodiments, the aqueous solution and the C4 solvent of step (1) are mixed and pulverized for 15 minutes by the ultrasonic biopulverizer operating at high-power of 500 W and 90% power output under a temperature of 10° C.

In some embodiments, a mass ratio of the pH-responsive polymer, the water-soluble metal salt, and the deionized water in step (1) is 2:(1-5):100; and a mass ratio of the aqueous solution to the C4 solvent is (15-25):100.

In some embodiments, the alkali solution described in step (2) is an aqueous solution of sodium hydroxide, potassium hydroxide or ammonium hydroxide at a mass concentration of 1-3%, and a mass ratio of the alkali solution, the sorbitan monooleate and the C4 solvent is (10-15):(3-5):100, and the mixture is pulverized by the ultrasonic biopulverizer operating at high power of 500 W and 90% power output for 5 minutes under a temperature of 5° C.

In some embodiments, the film in step (3) is a polymer film.

In some embodiments, a mass ratio of the inverse miniemulsion loaded with the precursor and the alkaline miniemulsion in step (3) is 20:(1-2); a volume ratio of a mixed solution of the inverse miniemulsion loaded with the precursor and the alkaline miniemulsion and the high-pressure reactor is 25:100; and the high-pressure reactor is a synthesis vessel with an inner lining of polytetrafluoroethylene and a coat of stainless steel.

In some embodiments, the set temperature of the oven in step (3) is 60-120° C., and a predetermined insulation time of the oven is 24-48 hours; and the modified film is washed with a mixed solution of acetone, deionized water and ethanol, wherein a mass ratio of the acetone, deionized water and ethanol in the mixed solution is 1:1:1.

BRIEF DESCRIPTION OF THE DRAWINGS

The present disclosure will be further explained through exemplary embodiments. These exemplary embodiments are described in detail with reference to the drawings.

FIG. 1 is a scanning electron microscope image of a film prepared according to Example 1 of the present disclosure.

DETAILED DESCRIPTION

In order to provide a clearer understanding of the technical issues, solutions, and beneficial effects addressed in the present disclosure, the technical solutions of the present disclosure are further detailed in the following embodiments. It should be understood that the specific embodiments described herein are intended only to explain the present disclosure and do not serve to limit the present disclosure.

There are various methods for surface modification of film, but all of them have certain defects, such as surface modification may affect the nature of the material itself, plasma technology has a short timeliness and a complicated process, and the laser surface treatment technology is not mature.

Embodiments of the present disclosure provide a method of modifying a surface of a film with an inverse miniemulsion. The method comprises the following steps.

(1) Preparing an Inverse Miniemulsion Loaded with a Precursor.

Step (1) includes obtaining an aqueous solution by dissolving a pH-responsive polymer and a water-soluble metal salt that is configured to form a precursor in deionized water at room temperature, and controlling pH to 7-8; and mixing the aqueous solution with a C4 solvent, and rapidly transferring the mixture into an ultrasonic biopulverizer at a pre-set temperature for pulverization to obtain the inverse miniemulsion loaded with the precursor.

In some embodiments, the pH-responsive polymer in step (1) may be poly(4-vinylpyridine), polydimethylaminoethyl methacrylate (or referred to as poly(2-(dimethylamino)ethyl methacrylate)), or poly(allylamine hydrochloride ester), and the relative molecular mass of the pH-responsive polymer may be 1000-5000. In some embodiments, the relative molecular mass of the pH-responsive polymer may be 1000, 3000, or 5000.

In some embodiments, the water-soluble metal salt that forms the precursor in step (1) may be sulfate, nitrate, or chloride having iron, copper, chromium, gold, or cadmium metals. In some embodiments, the water-soluble metal salt that forms the precursor in step (1) may be iron sulfate, copper nitrate, copper nitrate, or iron sulfate.

In some embodiments, the aqueous solution and the C4 solvent in step (1) may be mixed and pulverized for 15 minutes by the ultrasonic biopulverizer operating at high-power of 500 W and 90% power output under a temperature of 10° C.

In some embodiments, a mass ratio of the pH-responsive polymer, the water-soluble metal salt that forms the precursor, and the deionized water in step (1) may be 2:(1-5):100; in some embodiments, a mass ratio of the pH-responsive polymer, the water-soluble metal salt that forms the precursor, and the deionized water in step (1) may be 2:1:100, 2:4:100, or 2:5:100.

In some embodiments, the mass ratio of the aqueous solution to the C4 solvent in step (1) may be (15-25):100. In some embodiments, the mass ratio of the aqueous solution to the C4 solvent in step (1) may be 15:100, 20:100, or 25:100.

(2) Configuring an Alkaline Miniemulsion:

Sorbitan monooleate (or referred to as Span 80) is dissolved in the C4 solvent at the room temperature and mixed with an alkaline solution to form a mixture; and the mixture is transferred into the ultrasonic biopulverizer at a pre-set temperature for pulverization to obtain the alkaline miniemulsion;

In some embodiments, the alkali solution in step (2) may be an aqueous solution of sodium hydroxide, potassium hydroxide, or ammonium hydroxide at a mass concentration of 1-3%; in some embodiments, the alkali solution may be 1% sodium hydroxide solution, 3% sodium hydroxide solution, or 2% ammonium hydroxide.

In some embodiments, a mass ratio of the alkali solution, the sorbitan monooleate, and the C4 solvent of step (2) may be (10-15):(3-5):100; in some embodiments, the mass ratio of the alkali solution, the sorbitan monooleate, and the C4 solvent may be 10:3:100, 12:4:100, or 15:5:100.

In some embodiments, the mixture may be pulverized by the ultrasonic biopulverizer operating at high power of 500 W and 90% power output for 5 minutes state under a temperature of 5° C.

(3) Preparing an Oxide Nanocrystal Surface-Modified Film by a Solvothermal Process.

after a film in a high-pressure reactor is stretched and fixed, adding the inverse miniemulsion loaded with the precursor prepared in step (1) and the alkaline miniemulsion prepared in step (2); placing the high-pressure reactor in an oven at a set temperature for thermal insulation, causing the precursor to migrate to the surface of the film for deposition and formation of an oxide nanocrystal by solvent thermal treatment, so as to obtain a modified film; and removing the modified film after the solvent thermal treatment is completed, repeatedly washing the modified film, and drying at the room temperature to obtain the oxide nanocrystal surface-modified film.

In some embodiments, the film in step (3) may be a polymer film.

In some embodiments, a mass ratio of the inverse miniemulsion loaded with the precursor and the alkaline miniemulsion in step (3) may be 20:(1-2). In some embodiments, the mass ratio of the inverse miniemulsion loaded with the precursor and the alkaline miniemulsion in step (3) may be 20:1, 20:1.6, or 20:2.

In some embodiments, a volume ratio of a mixed solution of the inverse miniemulsion loaded with the precursor and the alkaline miniemulsion and the high-pressure reactor is 25:100.

In some embodiments, the high-pressure reactor is a synthesis vessel with an inner lining of polytetrafluoroethylene and a coat of stainless steel.

In some embodiments, the set temperature of the oven in step (3) may be 60-120° C.; in some embodiments, the set temperature of the oven in step (3) may be 60° C., 100° C., or 120° C.

In some embodiments, a predetermined insulation time of the oven may be 24-48 hours; in some embodiments, the predetermined insulation time of the oven may be 24 hours, 36 hours, or 48 hours.

In some embodiments, the modified film is removed at the end of the solvent thermal treatment in step (3), and the modified film may be washed with a mixed solution of acetone, deionized water, and ethanol, wherein a mass ratio of the acetone, deionized water and ethanol in the mixed solution is 1:1:1.

In the embodiments of the present disclosure, a solvent thermal treatment makes the oxide nanocrystal to migrate to the surface of the film, so as to complete the formation of the oxide nanocrystal modification on the surface of the film. The beneficial effects thereof include, but are not limited to: (1) the size of the oxide nanocrystal modified on the surface of the film is 3-5 nm, and the distribution of the nanocrystals on the surface is uniform; (2) the use of the pH-responsive polymers can control the migration rate of the oxide nanocrystal precursor to the film surface during the solvent thermal treatment, and control the nanocrystal size; (3) the solvothermal process reduces the temperature of the oxide nanocrystal formation, by which functional films with a variety of the oxide nanocrystal modified surfaces can be formed at one time.

EXAMPLES

Example 1

Example 1 of the present disclosure provides a method of modifying a surface of a film with an inverse miniemulsion, comprising the following steps.
(1) Preparing an Inverse Miniemulsion Loaded with a Precursor.

An aqueous solution was formed by dissolving 2 g poly(4-vinylpyridine) with a relative molecular mass of 1,000 and 1 g of ferric sulfate in 100 g deionized water at a controlled pH of 7 at room temperature; 15 g aqueous solution was mixed with 100 g C4 solvent. The mixture was rapidly transferred to a high power 500 W ultrasonic biopulverizer at pre-set temperature to pulverize at 90% power output for 15 min at 10° C. An inverse miniemulsion loaded with the precursor was obtained.
(2) Configuring an Alkaline Miniemulsion.

At room temperature, 3 g sorbitan monooleate was dissolved in 100 g C4 solvent and mixed with 10 g of 1% mass concentration sodium hydroxide solution to form a mixture. The mixture was transferred to a high-power 500 W ultrasonic biopulverizer and pulverized at 90% power output for 5 minutes at 5° C. to obtain the alkaline miniemulsion.
(3) Preparing an Oxide Nanocrystal Surface-Modified Film by a Solvothermal Process.

After the 1×1 cm poly(vinylidene fluoride) film was stretched and fixed in a 100 mL high-pressure reactor, 20 g inverse miniemulsion loaded with the precursor prepared in step (1) and 1 g alkaline miniemulsion prepared in step (2) were added; then the high-pressure reactor was placed in an oven at 60° C. for 24 hours, and the precursor was migrated to the surface of the film for deposition, and the oxide nanocrystal is formed by solvent thermal treatment. The film was removed at the end of the solvent thermal treatment, and the modified film was repeatedly cleaned with a mixed solution of acetone, deionized water, and ethanol, with a mass ratio of 1:1:1. The oxide nanocrystal surface-modified film was obtained after drying at room temperature. The nanocrystals were observed by scanning electron microscope to be about 3 nm in size and evenly distributed.

Example 2

Example 2 of the present disclosure provides another method of modifying a surface of a film with an inverse miniemulsion, comprising the following steps.
(1) Preparing an Inverse Miniemulsion Loaded with a Precursor.

An aqueous solution was formed by dissolving 2 g polydimethylaminoethyl methacrylate with a relative molecular mass of 5000 and 5 g copper nitrate in 100 g deionized water at a controlled pH of 8 at room temperature; 25 g aqueous solution was mixed with 100 g C4 solvent, and the mixture was rapidly transferred to a high-power 500 W ultrasonic biopulverizer at a pre-set temperature to be pulverized at 90% power output for 15 minutes at 10° C. to obtain an inverse miniemulsion loaded with the precursor.
(2) Configuring an Alkaline Miniemulsion.

At room temperature, 5 g of sorbitan monooleate was dissolved in 100 g of C4 solvent, and mixed with 15 g of 3% mass concentration sodium hydroxide solution to form a mixture. The mixture was transferred to a high-power 500 W ultrasonic biopulverizer operating at 90% power output, and pulverized for 5 minutes at a temperature of 5° C. to obtain the alkaline miniemulsion.
(3) Preparing an Oxide Nanocrystal Surface-Modified Film by a Solvothermal Process.

After the 1×1 cm polycarbonate film was stretched and fixed in a 100 mL high-pressure reactor, 20 g inverse miniemulsion loaded with the precursor prepared in step (1) and 2 g alkaline miniemulsion prepared in step (2) were added. The high-pressure reactor was then placed in a 120° C. oven for 48 hours. Through the solvent thermal treatment, the precursor migrated to the surface of the film for deposition, forming the oxide nanocrystal. The film was removed at the end of the solvent thermal treatment, and the modified film was repeatedly cleaned with a mixed solution of acetone, deionized water, and ethanol, with a mass ratio of 1:1:1. The oxide nanocrystal surface-modified film was obtained after drying at room temperature. The nanocrystals, with a rough size of approximately 5 nm, were observed to be uniformly distributed through scanning electron microscope.

Example 3

Example 3 of the present disclosure provides another method of modifying a surface of a film with an inverse miniemulsion, comprising the following steps:
(1) Preparing an Inverse Miniemulsion Loaded with a Precursor.

An aqueous solution was formed by dissolving 2 g poly(allylamine hydrochloride ester) with a relative molecular mass of 3,000, 2.5 g copper nitrate, and 1.5 g ferric sulfate in 100 g deionized water, with a controlled pH at 7.5 at room temperature. 20 g aqueous solution was then mixed with 100 g C4 solvent, and the mixture was rapidly transferred to a high-power 500 W ultrasonic biopulverizer at a pre-set temperature to be pulverized at 90% power state for 15 minutes at a temperature of 10° C., to obtain the inverse miniemulsion loaded with the precursor.
(2) Configuring an Alkaline Miniemulsion.

At room temperature, 4 g sorbitan monooleate was dissolved in 100 g C4 solvent and mixed with 12 g of 2% mass concentration ammonium hydroxide to form a mixture. The mixture was transferred to a high-power 500 W ultrasonic biopulverizer and pulverized at 90% power state for 5 minutes at 5° C. to obtain the alkaline miniemulsion.
(3) Preparing an Oxide Nanocrystal Surface-Modified Film by a Solvothermal Process.

After the 1×1 cm polyethylene glycol terephthalate film was stretched and fixed in a 100 mL high-pressure reactor, an inverse miniemulsion loaded with the precursor prepared in step (1) and 1.6 g alkaline miniemulsion prepared in step (2) were added; then the high-pressure reactor was placed in an oven at 100° C. for 36 h, and the precursor was migrated to the surface of the film to for deposition by the solvent thermal treatment and the oxide nanocrystal was formed. The film was removed at the end of the solvent thermal treatment, and the modified film was repeatedly cleaned with a mixed solution of acetone, deionized water, and ethanol, with a mixed solution mass ratio of 1:1:1. The oxide nanocrystal surface-modified film was obtained after drying at room temperature. The nanocrystals, with a rough size of approximately 5 nm, were observed to be uniformly distributed through scanning electron microscope; and the elemental analysis of the electron microscope showed that the ratio of the number of Cu elements and Fe elements was 2:1.

The foregoing description of the embodiments is for the purpose of facilitating that a person of ordinary skill in the art will be able to understand and apply the present invention. Persons skilled in the art will obviously be able to readily make a variety of modifications to these embodiments and apply the general principles illustrated herein to other embodiments without the need for creative labor. Thus, the present invention is not limited to the embodiments herein, and modifications made by those skilled in the art with respect to the present invention in accordance with the present disclosure of the present invention should be within the scope of protection of the present invention.

What is claimed is:

1. A method of modifying a surface of a film with an inverse miniemulsion, the method comprising:
    (1) preparing an inverse miniemulsion loaded with a precursor:
    obtaining an aqueous solution by dissolving a water-soluble metal salt used to form a precursor and a pH-responsive polymer in deionized water at room temperature and controlling pH to 7-8; and
    mixing the aqueous solution with a C4 solvent to obtain a mixture, and rapidly transferring the mixture into an ultrasonic biopulverizer at a pre-set temperature for pulverization to obtain the inverse miniemulsion loaded with the precursor;
    (2) configuring an alkaline miniemulsion:
    dissolving sorbitan monooleate in the C4 solvent at the room temperature and mixing it with an alkaline solution to form a mixture; and
    transferring the mixture into the ultrasonic biopulverizer at a pre-set temperature for pulverization to obtain the alkaline miniemulsion; and
    (3) preparing an oxide nanocrystal surface-modified film by a solvothermal process:
    after a film in a high-pressure reactor is stretched and fixed, adding the inverse miniemulsion loaded with the precursor prepared in step (1) and the alkaline miniemulsion prepared in step (2);
    placing the high-pressure reactor in an oven at a set temperature for thermal insulation, causing the precursor to migrate to the surface of the film for deposition and formation of an oxide nanocrystal by the solvent thermal treatment, so as to obtain a modified film; and
    removing the modified film after the solvent thermal treatment is completed, repeatedly washing the modified film, and drying at the room temperature to obtain the oxide nanocrystal surface-modified film.

2. The method of claim 1, wherein the pH-responsive polymer of step (1) is at least one of poly(4-vinylpyridine), polydimethylaminoethyl methacrylate or poly(allylamine hydrochloride ester), and the pH-responsive polymer has a relative molecular mass of 1000-5000.

3. The method of claim 1, wherein the water-soluble metal salt of step (1) is selected from at least one of sulfate, nitrate, and chloride having iron, copper, chromium, gold, or cadmium metals.

4. The method of claim 1, wherein the aqueous solution and the C4 solvent of step (1) are mixed and pulverized for 15 minutes by the ultrasonic biopulverizer operating at high power of 500 W and 90% power output under a temperature of 10° C.

5. The method of claim 1, wherein a mass ratio of the pH-responsive polymer, the water-soluble metal salt, and the deionized water in step (1) is 2:(1-5):100; and a mass ratio of the aqueous solution to the C4 solvent is (15-25):100.

6. The method of claim 1, wherein in step (2), the alkali solution is an aqueous solution of sodium hydroxide, potassium hydroxide or ammonium hydroxide at a mass concentration of 1-3%, and a mass ratio of the alkali solution, the sorbitan monooleate and the C4 solvent is (10-15):(3-5):100; and the mixture is pulverized by the ultrasonic biopulverizer operating at high power of 500 W and 90% power output for 5 minutes under a temperature of 5° C.

7. The method of in claim 1, wherein the film in step (3) is a polymer film.

8. The method of claim 1, wherein a mass ratio of the inverse miniemulsion loaded with the precursor and the alkaline miniemulsion in step (3) is 20:(1-2); a volume ratio of a mixed solution of the inverse miniemulsion loaded with the precursor and the alkaline miniemulsion and the high-pressure reactor is 25:100; and the high-pressure reactor is a synthesis vessel with an inner lining of polytetrafluoroethylene and a coat of stainless steel.

9. The method of claim 1, wherein the set temperature of the oven in step (3) is 60-120° C., and a predetermined insulation time of the oven is 24-48 hours; and the modified film is washed with a mixed solution of acetone, deionized water and ethanol, wherein a mass ratio of the acetone, deionized water and ethanol in the mixed solution is 1:1:1.

* * * * *